(12) United States Patent
Bai et al.

(10) Patent No.: US 9,504,062 B2
(45) Date of Patent: Nov. 22, 2016

(54) METHOD AND DEVICE FOR SCHEDULING DOWNLINK DATA TRANSMISSION

(71) Applicant: Huawei Technologies Co., Ltd., Shenzhen, Guangdong (CN)

(72) Inventors: Wei Bai, Shenzhen (CN); Chen Chi, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 36 days.

(21) Appl. No.: 14/583,475

(22) Filed: Dec. 26, 2014

(65) Prior Publication Data

US 2015/0110059 A1    Apr. 23, 2015

Related U.S. Application Data

(63) Continuation of application No. PCT/CN2012/077971, filed on Jun. 29, 2012.

(51) Int. Cl.
| | |
|---|---|
| H04W 4/00 | (2009.01) |
| H04W 72/12 | (2009.01) |
| H04W 72/04 | (2009.01) |
| H04L 5/00 | (2006.01) |
| H04W 28/18 | (2009.01) |

(52) U.S. Cl.
CPC ........ *H04W 72/1273* (2013.01); *H04L 5/0091* (2013.01); *H04W 72/042* (2013.01); *H04W 72/1278* (2013.01); *H04W 28/18* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,385,931 | B2 * | 2/2013 | Landstrom | H04W 72/1252 370/252 |
| 9,144,062 | B2 * | 9/2015 | Chou | H04W 72/0413 |
| 2010/0157922 | A1 * | 6/2010 | Kim | H04L 5/0094 370/329 |
| 2012/0099453 | A1 * | 4/2012 | Sagfors | H04L 5/0007 370/252 |
| 2012/0314680 | A1 * | 12/2012 | Kela | H04W 72/042 370/329 |

FOREIGN PATENT DOCUMENTS

| | | |
|---|---|---|
| CN | 101647214 A | 2/2010 |
| CN | 101932039 A | 12/2010 |
| CN | 102045861 A | 5/2011 |
| WO | WO 2009/038303 A1 | 3/2009 |
| WO | WO 2010/067766 A1 | 6/2010 |
| WO | WO 2011/025426 A1 | 3/2011 |
| WO | WO 2012/006459 A1 | 1/2012 |

* cited by examiner

*Primary Examiner* — Frank Duong

(57) ABSTRACT

Embodiments of the present invention provide a method and a device for scheduling downlink data transmission, includes: sending scheduling basic information to a user equipment; receiving a scheduling request reported by the UE, where the scheduling request carries at least one scheduling parameter that is determined by the UE according to the scheduling basic information; determining whether the scheduling parameter determined by the UE in the scheduling request needs to be modified; sending a scheduling request response to the UE according to a result of the determining, where the scheduling request response indicates whether the scheduling parameter determined by the UE in the scheduling request needs to be modified; and if it is determined that there is a scheduling parameter that needs to be modified, sending, to the UE, a modified parameter value of the scheduling parameter that needs to be modified.

16 Claims, 6 Drawing Sheets

101. A base station sends scheduling basic information to a UE

102. The base station receives a scheduling request reported by the UE, where the scheduling request carries at least one scheduling parameter that is determined by the UE according to the scheduling basic information 103. The base station determines whether the scheduling parameter determined by the UE in the scheduling request needs to be modified 104. The base station sends a scheduling request response to the UE according to a result of the determining, where the scheduling request response indicates whether the scheduling parameter determined by the UE in the scheduling request needs to be modified, and if it is determined that there is a scheduling parameter that needs to be modified, sends, to the UE, a modified parameter value of the scheduling parameter that needs to be modified

FIG. 1

| Scheduling request response | Resource start position acknowledgment bit | Resource size acknowledgment bit | HARQ process number acknowledgment bit | ...... | UE-ID CRC | Modification information 1 | ...... |
|---|---|---|---|---|---|---|---|
| PDCCH-1 | 0 | 0 | 0 | ...... | UE-1 | | |
| PDCCH-2 | 1 | 0 | 0 | ...... | UE-2 | A resource start position is modified to a frequency band 2 | |

0=Acknowledgment, 1=Modification

FIG. 5

METHOD AND DEVICE FOR SCHEDULING DOWNLINK DATA TRANSMISSION

CROSS-REFERENCE TO RELATED APPLICATIONS

This application is a continuation of International Application No. PCT/CN2012/077971, filed on Jun. 29, 2012, which is hereby incorporated by reference in its entirety.

TECHNICAL FIELD

The present invention relates to the field of communications technologies, and in particular, to a method and a device for scheduling downlink data transmission.

BACKGROUND

A 3rd generation partnership project (3GPP) long term evolution (LTE) system includes a frequency division duplexing (FDD) mode and a time division duplexing (TDD) mode. In LTE TDD and LTE FDD systems, a base station delivers a physical downlink control channel (PD-CCH) to a user equipment (UE), where the PDCCH includes multiple kinds of scheduling information, such as a time-frequency resource position and a modulation and coding scheme used by the UE; and the UE sends uplink data and receives downlink data according to the PDCCH delivered by the base station.

The PDCCH includes multiple kinds of scheduling information; therefore, an overhead of a downlink control channel is relatively large, so that frequency spectrum efficiency is relatively low.

SUMMARY

An objective of embodiments of the present invention is to provide a method and a device for scheduling downlink data transmission, so that an overhead of a downlink control channel can be effectively reduced.

In order to achieve the foregoing objective, the embodiments of the present invention adopt the following technical solutions:

An embodiment of the present invention provides a method for scheduling downlink data transmission, which includes the following steps:

sending scheduling basic information to a UE;

receiving a scheduling request reported by the UE, where the scheduling request carries at least one scheduling parameter that is determined by the UE according to the scheduling basic information;

determining whether the scheduling parameter determined by the UE in the scheduling request needs to be modified;

sending a scheduling request response to the UE according to a result of the determining, where the scheduling request response indicates whether the scheduling parameter determined by the UE in the scheduling request needs to be modified; and if it is determined that there is a scheduling parameter that needs to be modified, sending, to the UE, a modified parameter value of the scheduling parameter that needs to be modified.

An embodiment of the present invention provides a method for scheduling downlink data transmission, which includes the following steps:

receiving scheduling basic information sent by a base station;

determining at least one scheduling parameter according to the scheduling basic information;

reporting a scheduling request to the base station, where the scheduling request carries the at least one determined scheduling parameter;

receiving a scheduling request response sent by the base station, where the scheduling request response indicates whether the scheduling parameter carried in the scheduling request needs to be modified, where whether the scheduling parameter carried in the scheduling request needs to be modified is determined by the base station;

if the base station determines that there is a scheduling parameter that needs to be modified, receiving a modified parameter value of the scheduling parameter that needs to be modified, where the modified parameter value is sent by the base station.

An embodiment of the present invention provides abase station, including:

a sending unit, configured to send scheduling basic information to a UE;

a receiving unit, configured to receive a scheduling request reported by the UE, where the scheduling request carries at least one scheduling parameter that is determined by the UE according to the scheduling basic information sent by the sending unit; and a determining unit, configured to determine whether the scheduling parameter determined by the UE in the scheduling request received by the receiving unit needs to be modified, where the sending unit is further configured to send a scheduling request response to the UE according to a result determined by the determining unit, where the scheduling request response indicates whether the scheduling parameter determined by the UE in the scheduling request needs to be modified; and the sending unit is further configured to, if the determining unit determines that there is a scheduling parameter that needs to be modified, send, to the UE, a modified parameter value of the scheduling parameter that needs to be modified.

An embodiment of the present invention provides a UE, including:

a receiving unit, configured to receive scheduling basic information sent by a base station;

a determining unit, configured to determine at least one scheduling parameter according to the scheduling basic information received by the receiving unit; and a sending unit, configured to report a scheduling request to the base station, where the scheduling request carries the at least one scheduling parameter determined by the determining unit, where the receiving unit is further configured to receive a scheduling request response sent by the base station, where the scheduling request response indicates whether the scheduling parameter carried in the scheduling request needs to be modified, where whether the scheduling parameter carried in the scheduling request needs to be modified is determined by the base station; and the receiving unit is further configured to, if the base station determines that there is a scheduling parameter that needs to be modified, receiving a modified parameter value of the scheduling parameter that needs to be modified, where the modified parameter value is sent by the base station.

With the method for scheduling downlink data transmission, the base station, and the UE provided in the embodiments of the present invention, the UE reports a scheduling parameter determined by the UE to the base station through a scheduling request, and the base station may complete scheduling by sending a scheduling request response. The scheduling request response does not need to include parameter values of various scheduling parameters, but only needs to indicate whether the scheduling parameter determined by the UE needs to be modified; therefore, an overhead of a downlink control channel can be effectively reduced, and frequency spectrum utilization efficiency can be effectively improved. Moreover, the UE reports the scheduling parameter determined by the UE; therefore, the UE may select a parameter that better satisfies a quality of experience (QoE) requirement of the UE, thereby achieving an objective of improving QoE of a user.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a flow chart of a method for scheduling downlink data transmission according to an embodiment of the present invention;

FIG. 5 is a schematic diagram of exemplary information formats of resource allocation request responses delivered by a base station to a UE1 and a UE2 in the method shown in FIG. 3;

DETAILED DESCRIPTION

Figure 2:
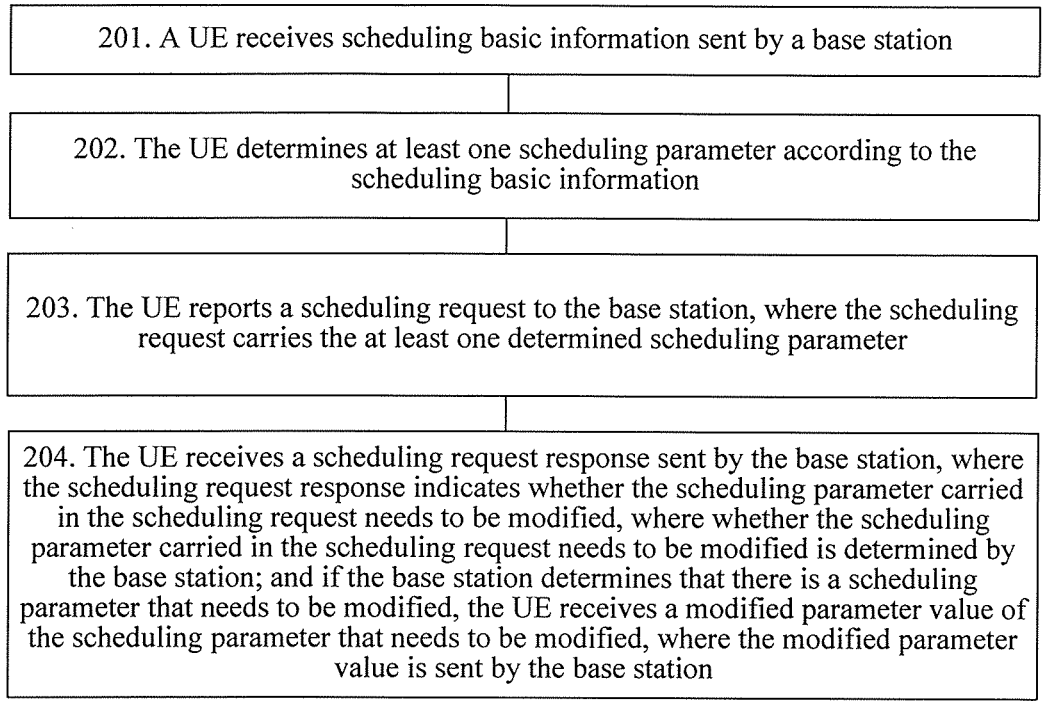
FIG. 2 is a flow chart of a method for scheduling downlink data transmission according to an embodiment of the present invention.

The following clearly describes the technical solutions in the embodiments of the present invention with reference to the accompanying drawings in the embodiments of the present invention. Apparently, the embodiments to be described are merely apart rather than all of the embodiments of the present invention. All other embodiments obtained by a person of ordinary skill in the art based on the embodiments of the present invention without creative efforts shall fall within the protection scope of the present invention.

First, it should be noted that a method for scheduling downlink data transmission, a base station, and a UE provided in the embodiments of the present invention are applied to wireless communications systems, and especially to an LTE wireless communications system. That the present invention is applied to an LTE or an advanced long term evolution (LTE-Advanced) wireless communications system is taken as an example for description in the following.

It should also be noted that the method for scheduling downlink data transmission, the base station, and the UE provided in the embodiments of the present invention are particularly applied to wireless communications systems of small cellular networks such as LTE-Hi/Pico/Femto, and definitely also applied to wireless communications systems of other network scales, which is not limited in the present invention.

As shown in FIG. 1, an embodiment of the present invention provides a method for scheduling downlink data transmission, which is executed by a base station, and includes the following steps:

101: A base station sends scheduling basic information to a UE.

In this step, specifically, the base station may send the scheduling basic information to the UE through a broadcast channel or radio resource control (RRC) signaling. It may be understood that which type of signaling through which the base station sends the scheduling basic information to the UE is not limited in the present invention, and other types of signaling may be used.

The scheduling basic information is information that indicates a current attribute of a communications system; and this information does not change during a data transmission process of current scheduling, and is used for assisting the UE in selecting a scheduling parameter. The scheduling parameter is described in detail in the following. For example, the scheduling basic information may include one or more of: the number of accessing UEs, information about frequency domain resource allocation, information about time domain resource allocation, and UE priority information. The number of accessing UEs indicates the number of UEs accessing the base station. The information about frequency domain resource allocation indicates allocation of a frequency resource in a cell of the base station. For example, the information about frequency domain resource allocation includes a start position and a size of a cell bandwidth of the cell of the base station; and for another example, the cell bandwidth is divided into several parts, and the information about frequency domain resource allocation includes information such as a start position and a size of each part that is obtained by dividing the cell bandwidth. The information about time domain resource allocation indicates allocation of a time resource in the cell of the base station. For example, the information about time domain resource allocation includes the number of hybrid automatic repeat (HARQ) processes allocated by the base station, and a subframe position occupied by each process; and the base station may allocate multiple HARQ processes. The UE priority information indicates a priority allocated by the base station for the UE; the base station may preferentially allocate more time-frequency resources for a UE with a higher priority according to a priority of each UE accessing the base station; and the UE may select an appropriate scheduling request algorithm after obtaining priority information, thereby determining a scheduling parameter.

It should be noted that in the embodiment of the present invention, the scheduling basic information is not limited to the content described in the foregoing, and the scheduling basic information may include any information that assists the UE in selecting a scheduling parameter.

Specifically, in an embodiment of the present invention, before this step, the base station detects a data amount of a data packet and/or priority information that needs to be sent to the UE, and generates the scheduling basic information according to the detected data amount and/or priority information. Then, in this step, the base station sends the generated scheduling basic information to the UE. When different UEs have different data amounts of data packets and priorities, in the scheduling basic information, the base station may allocate more time-frequency resources, such as more PRBs and/or more HARQ processes, for a user having a greater data amount or higher priority. When the UE reports a scheduling request, the UE may select an appropriate scheduling parameter according to UE priority information and pre-allocated time-frequency resource information in the scheduling basic information.

102: The base station receives a scheduling request reported by the UE, where the scheduling request carries at least one scheduling parameter that is determined by the UE according to the scheduling basic information.

After receiving the scheduling basic information sent by the base station, the UE determines at least one scheduling parameter according to the scheduling basic information, and reports the determined scheduling parameter to the base station through a scheduling request, so as to request the base station to give an acknowledgment or a modification opinion for the scheduling parameter determined by the UE.

The scheduling parameter is required information for scheduling data transmission between the UE and the base station. For example, the scheduling parameter reported by the UE in the scheduling request may include a resource allocation parameter and a transmission mode parameter. Specifically, the resource allocation parameter may include at least one of: a frequency domain resource allocation parameter and a time domain resource allocation parameter, where the frequency domain resource allocation parameter includes the number of physical resource blocks (PRB) and a start position of each PRB, and the time domain resource allocation parameter includes a subframe number or an HARQ process number. The transmission mode parameter includes one or several of: a modulation and coding scheme, a multiple-input multiple-output (MIMO) mode, and precoding information.

It may be understood that in the embodiment of the present invention, the scheduling parameter determined by the UE and reported by the UE through the scheduling request is not limited to the content described in the foregoing, and may be any control information for scheduling data transmission between the UE and the base station.

103: The base station determines whether the scheduling parameter determined by the UE in the scheduling request needs to be modified.

If the base station determines that a scheduling parameter in the scheduling request does not need to be modified, it indicates that the UE uses this scheduling parameter to perform data transmission with the base station; on the contrary, if the base station determines that a scheduling parameter in the scheduling request needs to be modified, it indicates that the UE cannot use this scheduling parameter to perform data transmission with the base station.

In the embodiment of the present invention, if the base station determines that a scheduling parameter in the scheduling request needs to be modified, the base station determines a modified parameter value of the scheduling parameter, and the UE uses the scheduling parameter whose parameter value is modified by the base station to perform data transmission with the base station. It should be noted that, when the base station determines whether a scheduling parameter in the scheduling request needs to be modified, it needs to ensure that data transmission of multiple UEs accessing the base station does not conflict with each other, and that data transmission between each UE and the base station can be performed normally and smoothly.

Specifically, in this step, the base station may determine, according to a preset scheduling algorithm, whether the at least one scheduling parameter determined by the UE in the scheduling request needs to be modified, where the scheduling algorithm may be a scheduling algorithm based on a UE priority principle, a scheduling algorithm based on a proportional fairness principle, a scheduling algorithm based on a polling principle, or a maximum carrier to interference C/I algorithm, or definitely may be another scheduling algorithm.

104: The base station sends a scheduling request response to the UE according to a result of the determining, where the scheduling request response indicates whether the scheduling parameter determined by the UE in the scheduling request needs to be modified, and if it is determined that there is a scheduling parameter that needs to be modified, sends, to the UE, a modified parameter value of the scheduling parameter that needs to be modified.

Being different from a PDCCH in the prior art, the scheduling request response in this step does not need to include specific content of control information, that is, a parameter value of each scheduling parameter, but only needs to include a reply opinion of the base station for each scheduling parameter reported by the UE, that is, whether each scheduling parameter needs to be modified; if the scheduling request response indicates that a scheduling parameter determined by the UE in the scheduling request does not need to be modified, it indicates that the base station agrees that the UE uses this scheduling parameter to perform data transmission with the base station; and if the scheduling request response indicates that a scheduling parameter determined by the UE in the scheduling request needs to be modified, it indicates that the base station does not agree that the UE uses this scheduling parameter, the base station needs to modify this scheduling parameter, and the UE uses the scheduling parameter modified by the base station to perform data transmission with the base station. In conclusion, an information amount of the scheduling request response is small, and when the scheduling request response is sent through a downlink control channel, an overhead of the downlink control channel can be effectively reduced, and frequency spectrum utilization efficiency can be effectively improved.

In this step, the scheduling request response may indicate, in multiple ways, whether the scheduling parameter determined by the UE needs to be modified.

For example, in an embodiment of the present invention, the scheduling request response includes reply information corresponding to each scheduling parameter among scheduling parameters determined by the UE in the scheduling request, where reply information corresponding to that it is determined that the scheduling parameter does not need to be modified is acknowledgment indication information, and reply information corresponding to that it is determined that the scheduling parameter needs to be modified is modification indication information. For example, when the UE reports multiple scheduling parameters, the scheduling request response of the base station includes a bit corresponding to each scheduling parameter reported by the UE, where the bit corresponding to each scheduling parameter has two values, namely, 0 and 1. In the scheduling request response, if a value of a bit corresponding to a scheduling parameter is 0, 0 is acknowledgment indication information, which indicates that the base station agrees the scheduling parameter determined by the UE; and if a value of a bit corresponding to a scheduling parameter is 1, 1 is modification indication information, which indicates that the base station does not agree the scheduling parameter determined by the UE and needs to modify the scheduling parameter. Definitely, it is also feasible that 1 represents acknowledgment and 0 represents modification. In this way, the scheduling request response only needs to include few bits of acknowledgment/modification indication information, which effectively saves a bandwidth resource overhead as compared with a case that parameter values of various scheduling parameters are included.

For example, in another embodiment of the present invention, the scheduling request response may only include modification indication information about that the base station determines that a scheduling parameter needs to be modified among scheduling parameters determined by the UE in the scheduling request, and does not include acknowledgment indication information about that the base station determines that a scheduling parameter does not need to be modified, that is, the base station only notifies the UE of a scheduling parameter that needs to be modified among the scheduling parameters determined by the UE in the scheduling request, and it is considered by default that the base station determines that a scheduling parameter in the scheduling request, which is not mentioned by the base station in the scheduling request response, does not need to be modified. After receiving such scheduling request response, the UE learns the scheduling parameter that needs to be modified, and the UE also learns that except the scheduling parameter that needs to be modified, all other scheduling parameters reported by the UE in the scheduling request are scheduling parameters that do not need to be modified as determined by the base station.

In the embodiment of the present invention, the scheduling request response is generally PDCCH information, but the present invention is not limited thereto. In order to further reduce a channel overhead, in an embodiment of the present invention, if in step 103, the base station determines that one or several of scheduling parameters determined by the UE in the scheduling request need to be modified, in this step, the base station sends a scheduling request response to the UE, where the scheduling request response is PDCCH information; however, if in step 103, the base station determines that scheduling parameters determined by the UE in the scheduling request all do not need to be modified, the base station does not need to send PDCCH information to the UE; and instead, the base station may respond to the scheduling request through hybrid automatic repeat request acknowledgment (HARQ ACK) information for the scheduling request, that is, the scheduling request response is HARQ ACK information responded by the base station for the scheduling request, where the scheduling request response is implicitly indicated by the HARQ ACK information, which is used to notify the UE that the scheduling parameters determined by the UE all do not need to be modified.

If the base station determines that one or several of scheduling parameters reported by the UE need to be modified, in an aspect, an indication needs to be given in the scheduling request response, and in another aspect, modified parameter values of these scheduling parameters that need to be modified need be sent to the UE, so that the UE performs data transmission with the base station according to the modified scheduling parameters. In an embodiment of the present invention, the scheduling request response is PDCCH information, and the base station may send, to the UE, the scheduling request response carrying the modified parameter value of the scheduling parameter that needs to be modified, that is, the scheduling request response directly carries the modified parameter value of the scheduling parameter that needs to be modified, for example, the modified parameter value is added at the end of the scheduling request response. Definitely, the base station may also send, to the UE through a channel other than a PDCCH, the modified parameter value of the scheduling parameter that needs to be modified, such as a PDSCH channel, which is not limited in the present invention.

In addition to the scheduling parameter reported by the UE, if the base station further needs to send other scheduling information to the UE to assist the UE in performing data transmission with the base station, in an embodiment of the present invention, the base station may carry supplement scheduling information in the scheduling request response, where the supplement scheduling information is scheduling information for assisting the UE in performing data transmission with the base station in addition to the scheduling parameter reported by the UE. The UE performs data transmission with the base station according to a scheduling parameter that is agreed and modified by the base station, and the supplement scheduling information. Optionally, the supplement scheduling information may include: a cyclic redundancy check (CRC) code and a UE identity (ID).

After this step, the base station performs downlink data transmission with the UE by using the scheduling parameter that is acknowledged, namely, agreed, and modified by the base station; and the UE performs data transmission with the base station according to the scheduling parameter that does not need to be modified as indicated by the base station in the scheduling request response, and the modified parameter value that is sent by the base station and is of the scheduling parameter that needs to be modified as indicated by the base station in the scheduling request response.

With the method for scheduling downlink data transmission provided in the embodiment of the present invention, the UE reports a scheduling parameter determined by the UE to the base station through a scheduling request, and the base station may complete scheduling by sending a scheduling request response, where the scheduling request response does not need to include parameter values of various scheduling parameters, but only needs to indicate whether the scheduling parameter determined by the UE needs to be modified; therefore, an overhead of a downlink control channel can be effectively reduced and frequency spectrum utilization efficiency can be effectively improved. Moreover, the UE reports the scheduling parameter determined by the UE; therefore, the UE may select a parameter that better satisfies a quality of experience (QoE) requirement of the UE, thereby achieving an objective of improving QoE of a user. In addition, when the method for scheduling downlink data transmission provided in the embodiment of the present invention is applied to small cellular network systems such as LTE-Hi/Pico/Femto, downlink transmission power of these small cellular network systems is smaller than that of macro network systems, but uplink transmission power of the small cellular network systems is equivalent to that of the macro network systems; therefore, compared with a macro network system, in a small cellular network, uplink transmission is more reliable than downlink transmission. Therefore, by using the method for scheduling downlink data transmission in the embodiment of the present invention, a reporting process of the UE is highly reliable, and an overhead of a downlink control channel delivered by the base station is small, thereby effectively improving transmission performance of the downlink control channel and reducing an error probability of the downlink control channel.

Corresponding to the foregoing method embodiment executed by the base station, as shown in FIG. 2, an embodiment of the present invention provides another method for scheduling downlink data transmission, which is executed by a UE and includes the following steps:

201: A UE receives scheduling basic information sent by a base station.

Reference is made to the foregoing description for details of the scheduling basic information, which is not described herein again.

Optionally, in this step, the UE receives the scheduling basic information that is sent by the base station through a broadcast channel or RRC signaling.

202: The UE determines at least one scheduling parameter according to the scheduling basic information.

In the same way, reference is made to the foregoing description for details of the scheduling parameter, which is not described herein again.

Specifically, the UE detects information such as channel quality between the UE and the base station according to frequency allocation basic information, and determines at least one scheduling parameter according to information such as the frequency allocation basic information and the detected channel quality. The UE may select a parameter that better satisfies a quality of experience QoE requirement of the UE.

203: The UE reports a scheduling request to the base station, where the scheduling request carries the at least one determined scheduling parameter.

After receiving the scheduling request, the base station delivers a scheduling request response, and gives, through the scheduling request response, a reply opinion for the scheduling parameter determined by the UE, that is, agrees or modifies the scheduling parameter determined by the UE.

204: The UE receives a scheduling request response sent by the base station, where the scheduling request response indicates whether the scheduling parameter carried in the scheduling request needs to be modified, where whether the scheduling parameter carried in the scheduling request needs to be modified is determined by the base station; and if the base station determines that there is a scheduling parameter that needs to be modified, the UE receives a modified parameter value of the scheduling parameter that needs to be modified, where the modified parameter value is sent by the base station.

In the same way, reference is made to the foregoing description for details of the scheduling request response, which is not described herein again.

The scheduling request response is generally PDCCH information, but the present invention is not limited thereto. In an embodiment of the present invention, if the base station determines that at least one scheduling parameter among scheduling parameters carried in the scheduling request needs to be modified, in this step, the scheduling request response received by the UE and sent by the base station is PDCCH information; however, if the base station determines that scheduling parameters carried in the scheduling request all do not need to be modified, in this step, the scheduling request response received by the UE and sent by the base station is HARQ ACK information responded by the base station for the scheduling request.

When the base station determines that one or several of scheduling parameters reported by the UE need to be modified, the base station further needs to send, to the UE, modified parameter values of these scheduling parameters that need to be modified. The base station may send, to the UE, a scheduling request response carrying the modified parameter value of the scheduling parameter that needs to be modified, and the UE receives the modified parameter value of the scheduling parameter that needs to be modified, where the modified parameter value is carried in the scheduling request response. Alternatively, the base station may also send, to the UE through a channel other than a PDCCH, the modified parameter value of the scheduling parameter that needs to be modified, and the UE receives, through the channel other than the PDCCH, the modified parameter value of the scheduling parameter that needs to be modified.

After receiving the scheduling request response, the UE performs data transmission with the base station according to the scheduling parameter that does not need to be modified as indicated by the base station in the scheduling request response, and the modified parameter value that is sent by the base station and is of the scheduling parameter that needs to be modified as indicated by the base station in the scheduling request response.

Further, in an embodiment of the present invention, the scheduling request response received in step 204 may further carry supplement scheduling information, for example, the supplement scheduling information may include the following information: a cyclic redundancy check code and a UE identity.

At this time, in this step, the UE performs data transmission with the base station according to a scheduling parameter that is acknowledged as indicated by the base station, a scheduling parameter that needs to be modified as indicated by the base station and has been modified, and the supplement scheduling information.

With the method for scheduling downlink data transmission provided in the embodiment of the present invention, the UE reports a scheduling parameter determined by the UE to the base station through a scheduling request, and the base station may complete scheduling by sending a scheduling request response, where the scheduling request response does not need to include parameter values of various scheduling parameters, but only needs to indicate whether the scheduling parameter determined by the UE needs to be modified; therefore, an overhead of a downlink control channel can be effectively reduced and frequency spectrum utilization efficiency can be effectively improved. Moreover, the UE reports the scheduling parameter determined by the UE; therefore, the UE may select a parameter that better satisfies a quality of experience (QoE) requirement of the UE, thereby achieving an objective of improving QoE of a user. In addition, when the method for scheduling downlink data transmission provided in the embodiment of the present invention is applied to small cellular network systems such as LTE-Hi/Pico/Femto, downlink transmission power of these small cellular network systems is smaller than that of macro network systems, but uplink transmission power of the small cellular network systems is equivalent to that of the macro network systems; therefore, compared with a macro network system, in a small cellular network, uplink transmission is more reliable than downlink transmission. Therefore, by using the method for scheduling downlink data transmission in the embodiment of the present invention, a reporting process of the UE is highly reliable, and an overhead of downlink control channel delivered by the base station is small, thereby effectively improving transmission performance of the downlink control channel and reducing an error probability of the downlink control channel.

The method for scheduling downlink data transmission in the present invention is described in further detail in the following through specific embodiments.

Figures 3, 4:
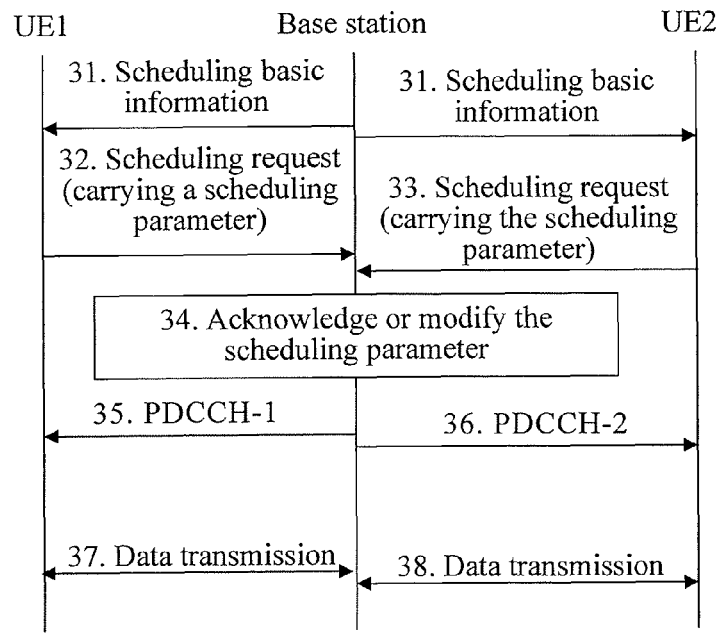
FIG. 3 is a flow chart of a method for scheduling downlink data transmission according to an embodiment of the present invention.
FIG. 4 is a schematic diagram of exemplary information formats of resource allocation requests reported by a UE1 and a UE2 in the method shown in FIG. 3.
Figure 6:
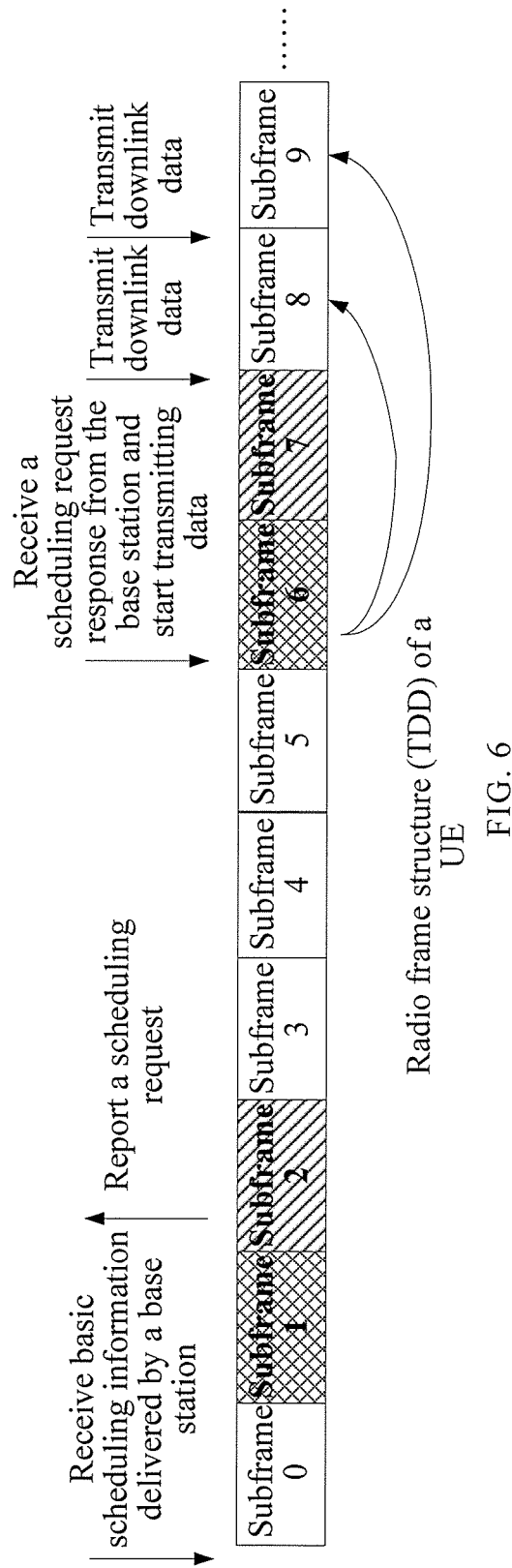
FIG. 6 is a schematic sequence diagram of a radio frame of a UE in the method shown in FIG. 3.

A method for scheduling downlink data transmission according to this embodiment is applied to a TDD system. In this embodiment, it is assumed that two UEs, namely, a UE1 and a UE2, access a base station. Referring to FIG. 3 to FIG. 6, FIG. 3 is a flow chart of this embodiment, FIG. 4 is a schematic diagram of exemplary information formats of scheduling requests reported by the UE1 and the UE2 in this embodiment, FIG. 5 is a schematic diagram of exemplary information formats of scheduling request responses delivered by the base station to the UE1 and the UE2 in this embodiment, and FIG. 6 is a schematic sequence diagram of a radio frame of a UE in this embodiment. This embodiment includes the following steps:

31: A base station detects that there are two UEs in a cell, and divides a cell bandwidth into two parts, namely, a frequency band 1 and a frequency band 2 according to a resource requirement imposed by services and channel conditions of the two UEs and according to the number of the UEs, records a start position and a size of each part, and sends scheduling basic information to the UE1 and the UE2 through RRC signaling, where the scheduling basic information includes the number of UEs accessing the base station, and start positions and sizes of the frequency band 1 and the frequency band 2.

It should be noted that the scheduling basic information in this embodiment is not limited to the content described in the foregoing, and may also include other content.

32: According to the scheduling basic information, by means of estimation by using a downlink data reference signal, and by comparing channel quality or CQIs of the frequency band 1 and the frequency band 2, the UE1 selects, namely, determines several best scheduling parameters applicable to the UE1, and reports a scheduling request to the base station, where the scheduling request carries the selected scheduling parameters.

FIG. 4 shows an exemplary information format of the scheduling request reported by the UE1; the scheduling request reported by the UE1 includes scheduling parameters such as a resource start position, a resource size, and an HARQ process number. Definitely, the information format shown in FIG. 4 is merely exemplary; and the scheduling request may have multiple formats, and may also include multiple scheduling parameters. In this embodiment, the UE1 selects the frequency band 1, the resource start position is a start position of the frequency band 1, the resource size is 20 resource elements (RE), and the HARQ process number is 1.

33: According to the scheduling basic information, by means of estimation by using a downlink data reference signal, and by comparing channel quality or CQIs of the frequency band 1 and the frequency band 2, the UE2 selects, namely, determines several best scheduling parameters applicable to the UE2, and reports a scheduling request to the base station, where the scheduling request carries the selected scheduling parameters.

FIG. 4 shows an exemplary information format of the scheduling request reported by the UE2; the scheduling request reported by the UE2 includes scheduling parameters such as a resource start position, a resource size, and an HARQ process number. Definitely, the information format shown in FIG. 4 is merely exemplary; and the scheduling request may have multiple formats, and may also include multiple scheduling parameters. In this embodiment, the UE2 selects the frequency band 1, the resource start position is a start position of the frequency band 1, the resource size is 20 REs, and the HARQ process number is 2.

34: The base station receives the scheduling requests reported by the UE1 and the UE2, and acknowledges or modifies, according to a scheduling algorithm, the scheduling parameters in the scheduling requests reported by the UE1 and the UE2.

In this step, the scheduling algorithm may be any scheduling algorithm based on a UE priority principle, a proportional fairness principle, and a polling principle, to ensure that resources between the UEs do not conflict with each other. Because the UE1 and the UE2 both select the frequency band 1 as the resource position, in this step, the base station determines, according to the scheduling algorithm, that the parameters reported by the UE1 all do not need to be modified, the resource position of the UE2 needs to be modified, and other parameters of the UE2 do not need to be modified either. The base station determines to modify the resource position of the UE2 to the frequency band 2.

35: The base station sends a scheduling request response PDCCH-1 to the UE1, where the PDCCH-1 includes reply information for each scheduling parameter reported by the UE1 and supplement scheduling information of the base station, and the reply information is acknowledgment indication information.

As shown in FIG. 5, the PDCCH-1 includes bits corresponding to the scheduling parameters reported by the UE1, where that a value of a bit is 0 represents acknowledgment, and that a value of a bit represents modification. The base station determines that the scheduling parameters reported by the UE1 all do not need to be modified; therefore, all values of bits in the PDCCH-1 corresponding to the scheduling parameters reported by the UE1 are 0. The PDCCH-1 further includes supplement scheduling information, namely, a CRC and a UE-id.

36: The base station sends a scheduling request response PDCCH-2 to the UE2, where the PDCCH-2 includes reply information for each scheduling parameter reported by the UE2 and supplement scheduling information and modification information of the base station; and the reply information includes acknowledgment indication information and modification indication information, and the modification information indicates a parameter value of a scheduling parameter that needs to be modified as determined by the base station.

As shown in FIG. 5, being the same as the PDCCH-1, the PDCCH-2 includes bits corresponding to the scheduling parameters reported by the UE2, where that a value of a bit is 0 represents acknowledgment, and that a value of a bit is 1 represents modification. The base station determines that the resource position reported by the UE2 needs to be modified, and other parameters do not need to be modified; therefore, a value of a bit in the PDCCH-2 corresponding to the resource start position reported by the UE2 is 1, which represents that the UE2 needs to modify the requested resource position. Values of bits corresponding to other scheduling parameters are 0. The PDCCH-2 further includes supplement scheduling information, namely, a CRC and a UE-id. The PDCCH-2 is also added with modification information, that is, a parameter value of a modified resource start position, and the resource start position is modified to the frequency band 2. Definitely, the modification information may also be sent on another channel.

37: The UE1 receives the PDCCH-1 delivered by the base station, and performs data transmission with the base station on the frequency band 1 by using the acknowledged scheduling parameters and the supplement scheduling information in the PDCCH-1.

38: The UE2 receives the PDCCH-2 delivered by the base station, and performs data transmission with the base station on the frequency band 2 by using the acknowledged scheduling parameters, the modified resource start position, and the supplement scheduling information in the PDCCH-2.

FIG. 6 shows a time sequence relationship between radio frames of the UE1 and the UE2. The scheduling basic information delivered by the base station is received through a physical downlink shared channel (PDSCH) of a downlink subframe, such as a subframe 0 or an earlier downlink subframe (depending on a receiving and processing delay of the UE), where the scheduling basic information changes slowly, that is, the scheduling basic information does not change within a period of time; the scheduling request is reported in an uplink subframe 2, and after a delay, the scheduling request response, namely, the acknowledgment or modification information, delivered by the base station on the PDCCH and data information transmitted in the downlink of the PDSCH are received in a downlink subframe 6; and in subsequent downlink subframes (such as subframes 8 and 9), based on a scheduling result of the base station, downlink transmission data is received on the PDSCH, so as to complete multi-subframe scheduling of the PDCCH once. When the channel changes, the UE may initiate a new scheduling request in an uplink subframe, receive, at a position of a corresponding downlink subframe, a PDCCH updated by the base station, and perform a new multi-subframe scheduling process.

It should be noted that the method for scheduling downlink data transmission in this embodiment may also be applied to an FDD system. In the FDD system, a time sequence relationship of control signaling of UEs in the FDD system is similar to that in Embodiment 1, and a difference lies in that the UEs in the FDD system may receive downlink control information or data in a same subframe through a downlink channel, and initiate a new scheduling request on an uplink channel at the same time, while the UEs in the TDD system must initiate a new scheduling request on a new uplink subframe.

Figure 7:
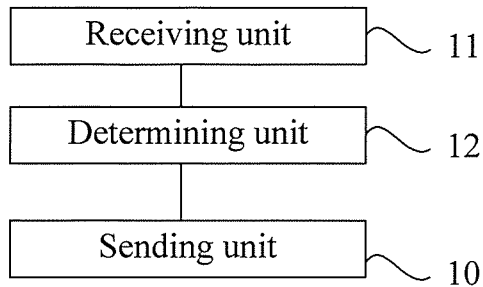
FIG. 7 is a structural block diagram of a base station according to an embodiment of the present invention.

Corresponding to the foregoing method embodiment, an embodiment of the present invention further provides a base station, as shown in FIG. 7, which includes:

a sending unit 10, configured to send scheduling basic information to a UE;

a receiving unit 11, configured to receive a scheduling request reported by the UE, where the scheduling request carries at least one scheduling parameter that is determined by the UE according to the scheduling basic information sent by the sending unit 10; and a determining unit 12, configured to determine whether the scheduling parameter determined by the UE in the scheduling request received by the receiving unit 11 needs to be modified.

The sending unit 10 is further configured to send a scheduling request response to the UE according to a result determined by the determining unit 12, where the scheduling request response indicates whether the scheduling parameter determined by the UE in the scheduling request needs to be modified.

The sending unit 10 is further configured to, if the determining unit 12 determines that there is a scheduling parameter that needs to be modified, send, to the UE, a modified parameter value of the scheduling parameter that needs to be modified.

With the base station provided in the embodiment of the present invention, the UE reports a scheduling parameter determined by the UE to the base station through a scheduling request, and the base station may complete scheduling by sending a scheduling request response. The scheduling request response does not need to include parameter values of various scheduling parameters, but only needs to indicate whether the scheduling parameter determined by the UE needs to be modified; therefore, an overhead of a downlink control channel can be effectively reduced, and frequency spectrum utilization efficiency can be effectively improved. Moreover, the UE reports the scheduling parameter determined by the UE; therefore, the UE may select a parameter that better satisfies a quality of experience QoE requirement of the UE, thereby achieving an objective of improving QoE of a user.

Optionally, in an embodiment of the present invention, the scheduling request response includes reply information corresponding to each scheduling parameter among scheduling parameters determined by the UE in the scheduling request, where reply information corresponding to that it is determined that the scheduling parameter does not need to be modified is acknowledgment indication information, and reply information corresponding to that it is determined that the scheduling parameter needs to be modified is modification indication information.

Optionally, in an embodiment of the present invention, the scheduling request response includes modification indication information about that it is determined that a scheduling parameter needs to be modified among scheduling parameters determined by the UE in the scheduling request.

Optionally, in an embodiment of the present invention, the sending unit 10 is specifically configured to:

if it is determined that at least one of scheduling parameters determined by the UE in the scheduling request needs to be modified, send the scheduling request response to the UE, where the scheduling request response is PDCCH information; and if it is determined that scheduling parameters determined by the UE in the scheduling request all do not need to be modified, send the scheduling request response to the UE, where the scheduling request response is HARQ ACK information for the scheduling request.

Optionally, in an embodiment of the present invention, the scheduling request response sent by the sending unit 10 is PDCCH information, and the sending unit 10 is specifically configured to send, to the UE, the scheduling request response carrying the modified parameter value of the scheduling parameter that needs to be modified; or send, to the UE through a channel other than a PDCCH, the modified parameter value of the scheduling parameter that needs to be modified.

Optionally, in an embodiment of the present invention, the sending unit 10 is specifically configured to: send the scheduling basic information to the UE through a broadcast channel or send the scheduling basic information to the UE through radio resource control (RRC) signaling.

Specifically, in an embodiment of the present invention, the scheduling basic information includes at least one kind of the following information: the number of accessing UEs, information about frequency domain resource allocation, information about time domain resource allocation, and UE priority information.

Specifically, in an embodiment of the present invention:
the scheduling parameter includes a resource allocation parameter and a transmission mode parameter;

the resource allocation parameter includes a frequency domain resource allocation parameter and/or a time domain resource allocation parameter, where the frequency domain resource allocation parameter includes the number of physical resource blocks and a start position of a physical resource block;

the time domain resource allocation parameter includes a subframe number or a hybrid automatic repeat process number; and the transmission mode parameter includes at least one of: a modulation and coding scheme, a multiple-input multiple-output mode, and precoding information.

Further, in an embodiment of the present invention, the scheduling request response further includes the following information: a cyclic redundancy check code and a UE identity.

Figure 8:
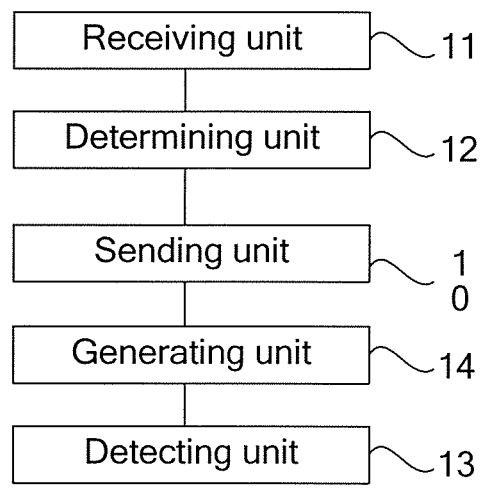
FIG. 8 is a structural block diagram of a base station according to an embodiment of the present invention.

Further, in an embodiment of the present invention, as shown in FIG. 8, the base station further includes:

a detecting unit 13, configured to detect a data amount of a data packet and/or priority information that needs to be sent to the UE; and a generating unit 14, configured to generate the scheduling basic information according to the data amount and/or priority information detected by the detecting unit 13.

The sending unit 10 is specifically configured to send the scheduling basic information generated by the generating unit 14 to the UE.

Figure 9:
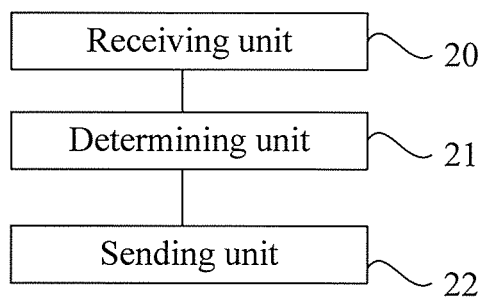
FIG. 9 is a structural block diagram of a UE according to an embodiment of the present invention.

Corresponding to the foregoing method, as shown in FIG. 9, an embodiment of the present invention further provides a UE, which includes:

a receiving unit 20, configured to receive scheduling basic information sent by a base station;

a determining unit 21, configured to determine at least one scheduling parameter according to the scheduling basic information received by the receiving unit 20; and a sending unit 22, configured to report a scheduling request to the base station, where the scheduling request carries the at least one scheduling parameter determined by the determining unit 21.

The receiving unit 20 is further configured to receive a scheduling request response sent by the base station, where the scheduling request response indicates whether the scheduling parameter carried in the scheduling request needs to be modified, where whether the scheduling parameter carried in the scheduling request needs to be modified is determined by the base station.

The receiving unit 20 is further configured to, if the base station determines that there is a scheduling parameter that needs to be modified, receive a modified parameter value of the scheduling parameter that needs to be modified, where the modified parameter value is sent by the base station.

The UE provided in the embodiment of the present invention reports a scheduling parameter determined by the UE to the base station through a scheduling request, and the base station may complete scheduling by sending a scheduling request response. The scheduling request response does not need to include parameter values of various scheduling parameters, but only needs to indicate whether the scheduling parameter determined by the UE needs to be modified; therefore, an overhead of a downlink control channel can be effectively reduced, and frequency spectrum utilization efficiency can be effectively improved. Moreover, the UE reports the scheduling parameter determined by the UE; therefore, the UE may select a parameter that better satisfies a quality of experience (QoE) requirement of the UE, thereby achieving an objective of improving QoE of a user.

Optionally, in an embodiment of the present invention, the scheduling request response includes reply information corresponding to each scheduling parameter among scheduling parameters carried in the scheduling request, where reply information corresponding to that the base station determines that the scheduling parameter does not need to be modified is acknowledgment indication information, and reply information corresponding to that the base station determines that the scheduling parameter needs to be modified is modification indication information.

Optionally, in an embodiment of the present invention, the scheduling request response includes modification indication information about that the base station determines that a scheduling parameter needs to be modified among scheduling parameters carried in the scheduling request.

Optionally, in an embodiment of the present invention, the receiving unit 20 is specifically configured to:

if the base station determines that at least one of scheduling parameters carried in the scheduling request needs to be modified, receive the scheduling request response sent by the base station, where the scheduling request response is PDCCH information; and if the base station determines that scheduling parameters carried in the scheduling request all do not need to be modified, receive the scheduling request response sent by the base station, where the scheduling request response is HARQ ACK information responded by the base station for the scheduling request.

Optionally, in an embodiment of the present invention, the scheduling request response is PDCCH information, and the receiving unit 20 is specifically configured to receive the modified parameter value of the scheduling parameter that needs to be modified, where the modified parameter value is carried in the scheduling request response; or receive, through a channel other than a PDCCH, the modified parameter value of the scheduling parameter that needs to be modified.

Specifically, in an embodiment of the present invention, the receiving unit 20 is specifically configured to: receive the scheduling basic information that is sent by the base station through a broadcast channel, or receive the scheduling basic information that is sent by the base station through radio resource control (RRC) signaling.

Specifically, in an embodiment of the present invention, the scheduling basic information includes at least one kind of the following information: the number of accessing UEs, information about frequency domain resource allocation, information about time domain resource allocation, and UE priority information.

Specifically, in an embodiment of the present invention:

the scheduling parameter includes a resource allocation parameter and a transmission mode parameter;

the resource allocation parameter includes a frequency domain resource allocation parameter and/or a time domain resource allocation parameter, where the frequency domain resource allocation parameter includes the number of physical resource blocks and a start position of a physical resource block;

the time domain resource allocation parameter includes a subframe number or a hybrid automatic repeat process number; and the transmission mode parameter includes at least one of: a modulation and coding scheme, a multiple-input multiple-output mode, and precoding information.

Further, in an embodiment of the present invention, the scheduling request response further includes the following information: a cyclic redundancy check code and a UE identity.

A person of ordinary skill in the art may understand that all or a part of the procedures of the foregoing method embodiments of the present invention may be implemented by a program instructing relevant hardware. The foregoing program may be stored in a computer readable storage medium. When the program runs, the steps of the foregoing method embodiments of the present invention are performed. The foregoing storage medium may be any medium that is capable of storing program code, such as a ROM, a RAM, a magnetic disk, or a compact disc.

It should be noted that, the units included in the foregoing UE and base station embodiments are divided merely according to function logic, which is not limited to the foregoing division, as long as corresponding functions can be realized; in addition, specific names of the functional units are merely provided for a purpose of distinguishing the units from one another, but are not intended to limit the protection scope of the present invention.

The foregoing descriptions are merely specific embodiments of the present invention, but are not intended to limit the protection scope of the present invention. Any variation or replacement that can be readily figured out by a person skilled in the art within the technical scope disclosed in the present invention shall all fall within the protection scope of the present invention. Therefore, the protection scope of the present invention shall be subject to the protection scope of the claims.

What is claimed is:

1. A method for scheduling downlink data transmission, the method comprising:
   sending, by a base station, scheduling basic information to a user equipment (UE);
   receiving, by the base station, a scheduling request reported by the UE, wherein the scheduling request carries at least one scheduling parameter that is determined by the UE according to the scheduling basic information;
   determining, by the base station, whether the scheduling parameter determined by the UE in the scheduling request needs to be modified;
   sending, by the base station, a scheduling request response to the UE according to a result of the determining, wherein the scheduling request response indicates whether the scheduling parameter determined by the UE in the scheduling request needs to be modified; and
   if it is determined that there is a scheduling parameter that needs to be modified, sending, by the base station, to the UE, a modified parameter value of the scheduling parameter that needs to be modified;
   wherein:
   the scheduling parameter comprises a resource allocation parameter and a transmission mode parameter;
   the resource allocation parameter comprises a frequency domain resource allocation parameter and/or a time domain resource allocation parameter;
   the frequency domain resource allocation parameter comprises a number of physical resource blocks and a start position of a physical resource block;
   the time domain resource allocation parameter comprises a subframe number or a hybrid automatic repeat (HARQ) process number; and
   the transmission mode parameter comprises at least one of: a modulation and coding scheme, a multiple-input multiple-output (MIMO) mode, and precoding information.

2. The method according to claim 1, wherein:
   the scheduling request response comprises reply information corresponding to each scheduling parameter among the scheduling parameter determined by the UE in the scheduling request, wherein reply information corresponding to a determination that a scheduling parameter does not need to be modified is acknowledgment indication information, and reply information corresponding to a determination that a scheduling parameter needs to be modified is modification indication information; or
   the scheduling request response comprises modification indication information in response to a determination that a scheduling parameter needs to be modified among the scheduling parameter determined by the UE in the scheduling request.

3. The method according to claim 1, wherein sending, by the base station, a scheduling request response to the UE according to a result of the determining comprises:
   if it is determined, by the base station, that the at least one scheduling parameter determined by the UE in the scheduling request needs to be modified, sending, by the base station, the scheduling request response to the UE, wherein the scheduling request response is physical downlink control channel (PDCCH) information; or
   if it is determined, by the base station, that the at least one scheduling parameter determined by the UE in the scheduling request all do not need to be modified, sending, by the base station, the scheduling request response to the UE, wherein the scheduling request response is hybrid automatic repeat request acknowledgment (HARQ ACK) information for the scheduling request.

4. The method according to claim 3, wherein:
   the scheduling request response is the PDCCH information; and
   sending, by the base station, to the UE, a modified parameter value of the scheduling parameter that needs to be modified comprises:
   sending, by the base station, to the UE, the scheduling request response carrying the modified parameter value of the scheduling parameter that needs to be modified, or
   sending, by the base station, to the UE through a channel other than a PDCCH, the modified parameter value of the scheduling parameter that needs to be modified.

5. The method according to claim 1, wherein sending, by the base station, scheduling basic information to a UE comprises:
   sending, by the base station, the scheduling basic information to the UE through a broadcast channel; or
   sending, by the base station, the scheduling basic information to the UE through radio resource control (RRC) signaling.

6. The method according to claim 1, wherein the scheduling basic information comprises at least one kind of the following information:
   a number of accessing UEs, information about frequency domain resource allocation, information about time domain resource allocation, and UE priority information.

7. The method according to claim 1, wherein:
before sending, by the base station, basic scheduling information to a UE, the method further comprises:
detecting, by the base station, a data amount of a data packet and/or priority information that needs to be sent to the UE, and
generating, by the base station, the scheduling basic information according to the detected data amount and/or priority information; and
sending, by the base station, scheduling basic information to a UE comprises:
sending, by the base station, the generated scheduling basic information to the UE.

8. The method according to claim 1, wherein the scheduling request response further comprises:
a cyclic redundancy check (CRC) code and a UE identity.

9. A base station, comprising:
a processor and a non-transitory processor-readable medium having processor-executable instructions stored thereon, the processor-executable instructions including a plurality of units comprising:
a sending unit, configured to send scheduling basic information to a user equipment (UE);
a receiving unit, configured to receive a scheduling request reported by the UE, wherein the scheduling request carries at least one scheduling parameter that is determined by the UE according to the scheduling basic information sent by the sending unit; and
a determining unit, configured to determine whether the scheduling parameter determined by the UE in the scheduling request received by the receiving unit needs to be modified;
wherein the sending unit is further configured to:
send a scheduling request response to the UE according to a result determined by the determining unit, wherein the scheduling request response indicates whether the scheduling parameter determined by the UE in the scheduling request needs to be modified; and
when the determining unit determines that there is a scheduling parameter that needs to be modified, send, to the UE, a modified parameter value of the scheduling parameter that needs to be modified;
wherein:
the scheduling parameter comprises a resource allocation parameter and a transmission mode parameter;
the resource allocation parameter comprises a frequency domain resource allocation parameter and/or a time domain resource allocation parameter;
the frequency domain resource allocation parameter comprises a number of physical resource blocks and a start position of a physical resource block;
the time domain resource allocation parameter comprises a subframe number or a hybrid automatic repeat (HARQ) process number; and
the transmission mode parameter comprises at least one of: a modulation and coding scheme, a multiple-input multiple-output (MIMO) mode, and precoding information.

10. The base station according to claim 9, further comprising:
a detecting unit, configured to detect a data amount of a data packet and/or priority information that needs to be sent to the UE;
a generating unit, configured to generate the scheduling basic information according to the data amount and/or priority information detected by the detecting unit; and
wherein the sending unit is configured to send the scheduling basic information generated by the generating unit to the UE.

11. The base station according to claim 9, wherein:
the scheduling request response comprises reply information corresponding to each scheduling parameter among the scheduling parameter determined by the UE in the scheduling request, wherein reply information corresponding to a determination that a scheduling parameter does not need to be modified is acknowledgment indication information, and reply information corresponding to a determination that a scheduling parameter needs to be modified is modification indication information; or
the scheduling request response comprises modification indication information in response to a determination that a scheduling parameter needs to be modified among the scheduling parameter determined by the UE in the scheduling request.

12. The base station according to claim 9, wherein the sending unit is configured to:
if it is determined that the at least one scheduling parameter determined by the UE in the scheduling request needs to be modified, send the scheduling request response to the UE, wherein the scheduling request response is physical downlink control channel (PDCCH) information; or
if it is determined that the at least one scheduling parameter determined by the UE in the scheduling request all do not need to be modified, send the scheduling request response to the UE, wherein the scheduling request response is hybrid automatic repeat request acknowledgment (HARQ ACK) information for the scheduling request.

13. The base station according to claim 12, wherein:
the scheduling request response sent by the sending unit is the PDCCH information; and
the sending unit is configured to:
send, to the UE, the scheduling request response carrying the modified parameter value of the scheduling parameter that needs to be modified, or
send, to the UE through a channel other than a PDCCH, the modified parameter value of the scheduling parameter that needs to be modified.

14. The base station according to claim 9, wherein the sending unit is configured to:
send the scheduling basic information to the UE through a broadcast channel; or
send the scheduling basic information to the UE through radio resource control (RRC) signaling.

15. The base station according to claim 9, wherein the scheduling basic information comprises at least one kind of the following information:
a number of accessing UEs, information about frequency domain resource allocation, information about time domain resource allocation, and UE priority information.

16. The base station according to claim 9, wherein the scheduling request response further comprises: a cyclic redundancy check (CRC) code and a UE identity.

* * * * *